Patented July 11, 1950

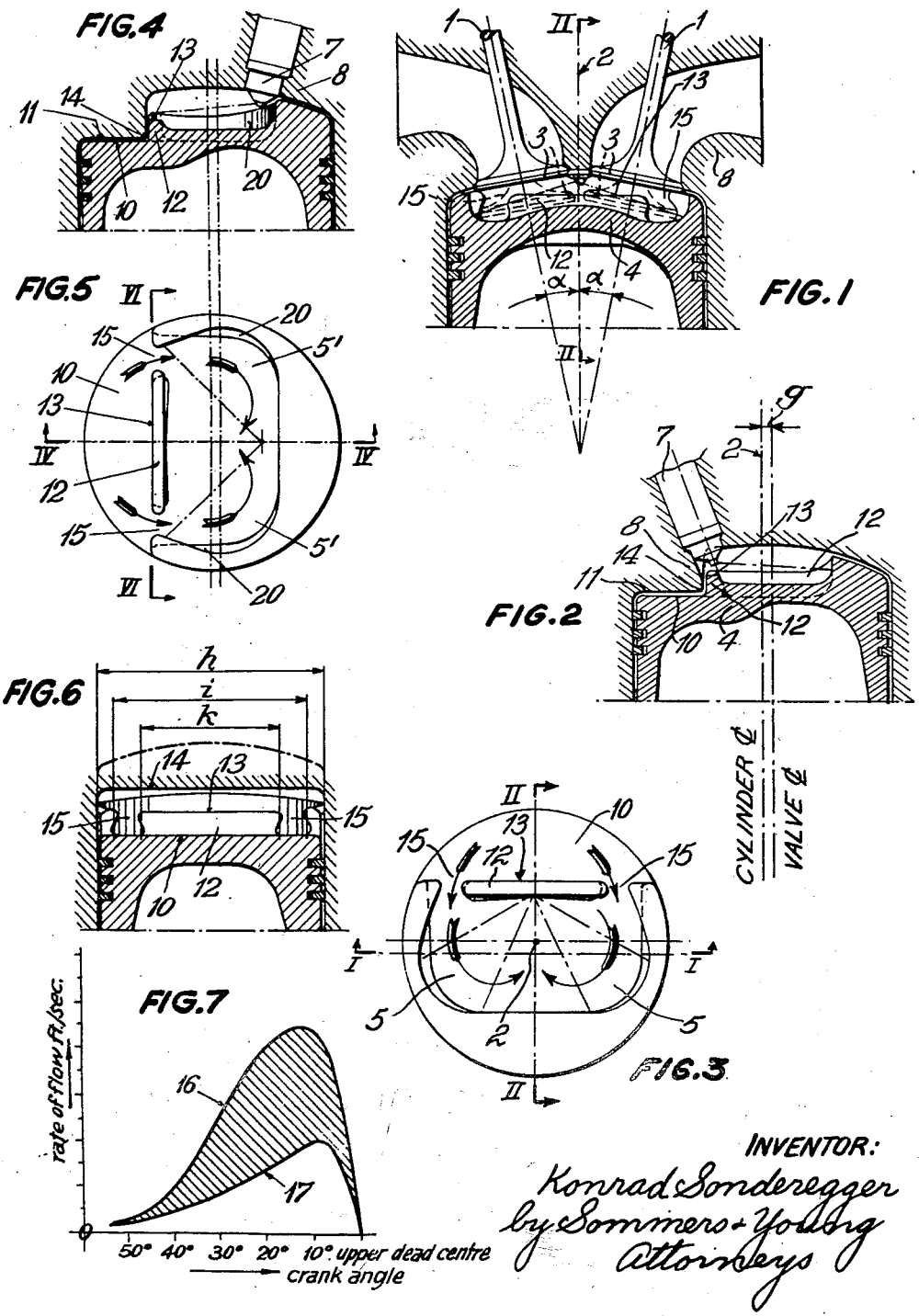

2,514,730

UNITED STATES PATENT OFFICE 2,514,730

COMBUSTION CHAMBER FOR INTERNAL-COMBUSTION ENGINES

Konrad Sonderegger, Winterthur, Switzerland, assignor to Schweizerische Lokomotiv- und Maschinenfabrik, Winterthur, Switzerland Application July 24, 1946, Serial No. 686,026
In Switzerland February 21, 1945

Section 1, Public Law 690, August 8, 1946
Patent expires February 21, 1965

2 Claims. (Cl. 123—32)

The invention relates to internal combustion engines of any stroke-cycle type provided with valve operating means and operating on the direct injection principle wherein a portion of the piston, shortly before the end of the compression stroke, serves to displace compressed air present in a displacement chamber and permits this air to flow to a combustion chamber, so that the formation of the mixture, above all in the case of engines operated on liquid fuel, will not be effected solely by the injected jets of fuel but will be supplemented by the forced movement of the air.

In prior art arrangements the combustion chamber is entirely or partly provided in the piston and usually adapted for a definite shape of jet. In such arrangements an efficient relationship can be established between the piston surface and the combustion chamber inlet surface. Scavenging can also be effected by providing valve pockets. The thus produced cleavage of the combustion chamber however does not permit attaining efficient mixture formation.

In another prior art arrangement, which also provides for scavenging, the valves are disposed in coaxial relation and operating in opposite directions in the combustion chamber. It is true that this makes it possible to scavenge the combustion chamber thoroughly, but it is not possible to cool the bottom of the piston effectively and this is an unpermissible condition so far as efficient charging is concerned. Moreover, the combustion chamber is surrounded by the cooling agent over practically its entire surface so that aside from the unavoidable heat losses involved, it is very difficult to obtain good combustion. As a matter of fact, these engine arrangements have not become accepted in any manner in the art.

It is also old, in the case of engines wherein the valve chamber simultaneously serves as a combustion chamber, to move the air forced by the piston into the combustion chamber in the form of an eddy, the axis of rotation of which extends parallel to the axis of the cylinder. Since the valve chamber in that case is to a large extent disposed in the cooled cylinder jacket, there is the danger, in the case of internal combustion engines of the injection type, that the fuel will be deposited on cooled surfaces and cause defective combustion. The eddy current movement can in such cases be controlled by means of a beading-like closure member provided with passages and disposed between the displacing member and the combustion chamber.

The advantages accruing from the prior art arrangements are embodied in the arrangement of the present invention but the drawbacks are completely eliminated in that, according to the invention, the displacing portion on the end surface of the piston is separated from the larger portion thereof by a beading, at the two ends of which openings are provided for the passage of the displaced combustion air to the combustion chamber. Moreover, the larger portion of the end surface of the piston which, at the side facing the piston, limits the combustion chamber, is constituted as a valve pocket for the valves, the said valve pocket having walls that are at least approximately cylindrical and which serve to a large extent for guiding the flow of air and for producing the eddy, the injection nozzle being disposed in the central plane between the two valves in such fashion that, during the compression dead-center position of the piston, it lies on the edge of the valve pocket.

Fig. 1 shows a first form of invention, in a cylinder section on the line I—I of Fig. 3;

Fig. 2 an axial cylinder section on the line II—II of Fig. 3;

Fig. 3 a top view of the piston according to the first embodiment;

Fig. 4 illustrates a second form of invention in an axial section on the line IV—IV of Fig. 5, with the injection nozzle offset toward the other side that of Fig. 1;

Fig. 5 a plan view of the piston;

Fig. 6 the piston, as seen in section on the line VI—VI of Fig. 5;

Fig. 7 is a diagram of the rate of flow.

In the designs according to Figs. 1–6, the valve axes $1$ are lying in one and the same plane which is offset, as shown in Fig. 2, relative to the cylinder axis $2$ by a distance $g$. The angle of inclination $\alpha$ of the valve axes, relative to the cylinder axis $2$, may be, e. g., 15°. When fully open, the valve heads $3$ nearly contact each other, as shown dotted in Fig. 1. The cylindrical valve pockets $5$ (Fig. 3), required in the piston head $4$ for accommodating the depressed valve heads, are adapted to form a combustion chamber of suitable shape both from an aero-dynamic and a fabricatory point of view. The said chamber permits of a positive scavenging and cooling.

The injection nozzle $7$, as shown in Figs. 2 and 4, is disposed laterally in the cylinder cover $8$ and inclined to the cylinder axis $2$. By means of a multi-jet nozzle the entire combustion space thus may be covered.

Although in the embodiments represented by

Figs. 1–3 the fuel nozzle is disposed in the cylinder head above the center of the displacement edge 14, (which cooperates with the heading 12) in Figs. 4–6 it is located diametrically opposite this point. Moreover the modification represented by Figs. 4–6 is essentially of similar construction and operation as the embodiments shown in Figs. 1–3 except as herein pointed out.

To improve the formation of the mixture, a double cross-flow of high velocity is applied. This is accomplished by means of a small displacing segment 10 on the piston face (Figs. 2–5) and a counterfacing segmental shoulder 11 on the cylinder cover 8. In order to impress the desired direction and velocity to the displaced air, the displacement chamber is closed off by a bulb bar 12 provided on the piston head. At both ends of the said bar 12 a passageway 15 is left open, which communicates with the said valve pockets 5 in the piston head. With the disposition of nozzle 7 as shown in Fig. 2, the fuel is injected substantially in the direction of the inrushing displaced air, and in that shown in Fig. 4 against same. The co-operating border edges 13, 14 on the bar 12 and the cylinder cover 8 respectively, slide past each other at a distance of less than 1 mm. The top edge or rim 13 of the bar 12 attains the elevation of the shoulder edge 14 of the countersegment 11 (Figs. 2 and 4) in the cylinder cover, approximately 30–40 crank-angle degrees ahead of the upper dead centre. By a certain proportioning of the dimensions $h$, $i$ and $k$ (Fig. 6), and by suitably adapting the passageways 15, the most favorable rate of flow in the combustion chamber, and thus a very good formation of the mixture may be attained.

The diagram of Fig. 7 shows the velocity of flow of the compressed air through the passage 15 on the piston face, in function of the crank position, and at a certain speed of rotation. Curve 16 indicates this velocity when a bar 12 has been provided for, and curve 17 indicates same when no such bar is existing. The diagram clearly demonstrates the extremely favorable effect of the bar 12, which has been proved by means of measurements on an experimental motor.

By the disposition shown and described, and by peripherally guiding the airflow entering into the combustion chamber through the ports 15 along the approximately cylindrical walls 20 of the valve pockets 5 (Fig. 5) two very powerful whirls are produced, which rotate in opposite directions. The axes of rotations of these whirls are, partly at least, approximately parallel to the cylinder axis.

The present invention also may be applied to engines of the opposed-piston type. In such a case, the counter-piston head facing the combustion chamber is shaped like the corresponding portion of the cylinder cover 8 shown in the drawing.

The plane of the valve axes may be concentric or eccentric to the cylinder axis.

The plane faces and straight edges of the whirling elements 10—14 ensure an easy machining.

When using more than two valves, more than one bar 12 may be provided for guiding the whirls.

The effect described also is produced in the case of gaseous fuels, so that the invention is not bound to any certain kind of fuel.

What I claim and desire to secure by Letters Patent, is:

1. An internal combustion engine having a cylinder and a piston reciprocating in the cylinder, the head of said cylinder being provided with a projecting shoulder located at one side of the cylinder axis and extending from the cylinder wall to a point intermediate the wall and the cylinder axis, said cylinder head being further provided with a recess located eccentrically with respect to the cylinder axis and extending from said projecting shoulder to the opposite cylinder wall, two valves located in the cylinder head and opening into said eccentrically located recess thereof, an injection nozzle disposed in the vertical plane passing between said two valves, the piston top being formed with a peripheral upwardly projecting flange extending over the portion of the circumference of the piston situated beneath said recess in the cylinder head, and with an upwardly projecting straight flange extending across the piston between opposite ends of said peripheral flange and providing passages between each end of the straight flange and the adjacent end of the peripheral flange, said peripheral flange and said straight flange cooperating with said recess in the cylinder head to define a combustion chamber at top dead center of the piston, and the portion of the piston top situated outside of the combustion chamber beyond said straight flange cooperating with said projecting shoulder on the cylinder head whereby when the piston is nearing the end of its compression stroke compressed air is urged through said passages into the combustion chamber along opposite faces of said peripheral flange to form in the combustion chamber two whirls rotating in opposed direction about axes substantially parallel with the cylinder axis.

2. An internal combustion engine according to claim 1, operating on the four-stroke-cycle principle, and in which portion of the piston constituting the valve pocket is so deeply recessed that the valves can be opened simultaneously and approximately fully at the end of the exhaust stroke for scavenging the combustion chamber.

KONRAD SONDEREGGER.

REFERENCES CITED

The following references are of record in the file of this patent:

UNITED STATES PATENTS

| Number | Name | Date |
| --- | --- | --- |
| 1,856,328 | French | May 3, 1932 |
| 2,100,143 | Mock | Nov. 23, 1937 |
| 2,206,322 | Huesby | July 2, 1940 |

FOREIGN PATENTS

| Number | Country | Date |
| --- | --- | --- |
| 270,971 | Germany | Feb. 26, 1904 |
| 355,813 | Great Britain | Aug. 31, 1931 |
| 377,470 | Italy | Dec. 18, 1939 |